United States Patent
Stites

[19]

[11] Patent Number: 6,045,021
[45] Date of Patent: *Apr. 4, 2000

[54] ARTICLE CARRIER FOR BICYCLES WITH CENTRALLY SUSPENDED HOOK

[76] Inventor: William J. Stites, 16 Elmwood Rd., Deer Park, N.Y. 11729

[*] Notice: This patent issued on a continued prosecution application filed under 37 CFR 1.53(d), and is subject to the twenty year patent term provisions of 35 U.S.C. 154(a)(2).

[21] Appl. No.: 08/766,814

[22] Filed: Dec. 13, 1996

[51] Int. Cl.[7] ........................................ B62J 7/04
[52] U.S. Cl. .................. 224/458; 224/426; 224/448; 224/460
[58] Field of Search .................. 224/412, 415, 224/419, 425–430, 441, 442, 445, 447, 448, 451–453, 458, 459, 460, 455, 457; 280/288.4, 292, 304.5, 202

[56] References Cited

U.S. PATENT DOCUMENTS

| | | | |
|---|---|---|---|
| 503,315 | 8/1893 | Gendron | 224/426 |
| 568,085 | 9/1896 | Finley | 224/458 |
| 660,615 | 10/1900 | Bauer | 224/458 |
| 1,030,844 | 6/1912 | Howell | 224/452 |
| 1,900,070 | 3/1933 | Murphy | 224/457 |
| 2,630,334 | 3/1953 | Ewers | 280/288.4 |
| 3,222,034 | 12/1965 | Jackson | 280/288.4 |
| 3,329,323 | 7/1967 | Tanaka | 224/425 |
| 3,338,484 | 8/1967 | Hall, Sr. | 224/425 |
| 3,495,749 | 2/1970 | Meadowcroft | 224/419 |
| 3,545,790 | 12/1970 | Davis et al. | 280/288.4 |
| 3,547,325 | 12/1970 | Hill | 224/425 |
| 4,022,488 | 5/1977 | Lokas | 280/202 |
| 4,383,625 | 5/1983 | Kiang | 224/455 |
| 4,792,072 | 12/1988 | Gibson | 224/425 |
| 4,948,020 | 8/1990 | Smith | 224/453 |
| 5,040,710 | 8/1991 | Lee | 224/448 |
| 5,135,143 | 8/1992 | Naughton | 224/458 |
| 5,496,089 | 3/1996 | Muderlak | 224/427 |

FOREIGN PATENT DOCUMENTS

| | | | |
|---|---|---|---|
| 709781 | 4/1931 | France | 224/39 |
| 81463 | 5/1956 | Netherlands | 224/39 R |
| 442104 | 2/1936 | United Kingdom | 224/39 R |

*Primary Examiner*—Gregory M. Vidovich

[57] ABSTRACT

A load carrier for use on bicycles incorporating a load-suspending hook. The hook is affixed atop two support tubes that are mounted directly to the rear triangle of a standard bicycle frame. Four mounting sites near the rear wheel axle provide secure mounting. The hook is located on the central, sagittal plane of the bicycle approximately 50–60 centimeters directly above the rear wheel. A restraining strap, such as an elastic bungee-type cord, secures the suspended load against the support tubes to prevent swinging and maintain the central, sagittal position. The forces of the load, which can comprise any handled bag including backpacks, remain centered during riding and do not adversely affect balance of the bicycle.

7 Claims, 5 Drawing Sheets

ARTICLE CARRIER FOR BICYCLES WITH CENTRALLY SUSPENDED HOOK

BACKGROUND OF THE INVENTION

1. Field of the Invention

This invention relates to load or article carrying apparatuses for use on bicycles.

2. Description of the Prior Art

Heretofore, most bicycle article carriers have followed a standard of a small platform placed horizontally over the rear wheel. This platform, typically no wider than 5–6 inches, is supported by two upright members attaching to or near the rear wheel axle. The front of such a rack is attached to the bicycle frame just below the seat, or may be attached to the seat post itself. U.S. Pat. No. 5,222,639 to Simonett illustrates such a standard rack while describing an additional load-restraining assembly.

U.S. Pat. No. 5,040,710 to Lee shows a similar platform concept that can be mounted to a variety of tubes on the bicycle frame.

Another type of article carrier is a basket, which is essentially a platform with walls. Handlebar mounted baskets are probably the most common article carrier in the front. Large baskets will sometimes have additional supports extended down to either side of the front axle. Alternately, U.S. Pat. No. 4,658,998 to Belka shows a support frame mounted to the front fork, for carrying loads on either side of the front wheel. Some front racks or baskets may avoid handlebar and fork mounting and attach directly to the bicycle frame. This arrangement avoids the interference of steering as affected by the lo turns.

Baskets and other containers have also been mounted on either side of the rear wheel. U.S. Pat. Nos. 4,516,705 to Jackson, and 4,577,786 to Dowrick et al. show fully enclosed containers on both sides of the rear wheel. Note that both of these exhibit similar structural support as the "standard" rear platform rack described above.

U.S. Pat. No. 5,244,132 to Christen illustrates panniers, which are more bag-like and are hung on a support structure. Panniers are probably the closest prior art to the invention based on the fact that they are suspended. However, the load contained within a pannier presents an imbalance as it is placed on the side of the wheel. While the load may be balanced by splitting it evenly between left and right panniers, it is not always feasible nor convenient to do so.

Some inventors have attempted to enhance convenience by creating combination units. U.S. Pat. Nos. 3,786,972 to Alley and 4,433,802 to Woolf show easily detachable containers that can take on the form of a backpack when not mounted to the bicycle. While these inventions attempt to allow a smoother transition from cycling to walking with a given load, the ergonomics of the resultant 'backpack' leave much to be desired.

Other rear-mounted article carriers noted are small bags or containers attached solely to the seat or seat-post (see U.S. Pat. No. 5,460,303 to Downs). These units are simply hung, or are cantilevered via some internal rigid structure. Such seat/seat-post units are inherently limited in their size and load-carrying capacity.

SUMMARY OF THE INVENTION

The invention provides an article carrier for bicycles that is mounted in the rear, so as not to interfere with steering or visibility. The invention is attached only to the rear triangle of the bicycle frame at four co-planar mounting sites. A load, comprising any handled bag, is suspended directly above the rear wheel and within the central, sagittal plane of the bicycle. The load is easily placed on and removed from a hook. The hook is of a closed-loop variety with a spring-loaded latch and thus provides a very secure means for preventing the load from falling off during rough bicycle riding.

The invention is compatible with newer bicycles exhibiting a rear wheel suspension. The article carrier of the invention is adjustable for various frame sizes. All parts of the article carrier are separable for easy packaging and shipment.

OBJECTS AND ADVANTAGES

The invention is very securely mounted to a bicycle at four mounting sites. Two mounts support each side of the article carrier or 'rack', and all mounting sites are upon the solid rear triangle of a standard bicycle frame. Standard rear bike racks (noted above), have only three points of attachment. More connections to the bicycle frame yields stronger mounting.

All four mounting sites are co-planar. This provides an advantage by defining a 'plane of flexibility', whereby the rack can flex slightly to and fro in response to load forces during riding. This spring-like effect is beneficial by dissipating energy throughout the rack and minimizing peak forces, especially upon the top mounting sites. The rate of mechanical failure is thus reduced.

The invention provides a significant advantage over the prior art by automaticaly centering the load and isolating all the load's forces upon the central, sagittal plane of the bicycle/rider system. A bicycle is relatively flat and is well represented by a sagittal plane that is vertically balanced (dotted line in FIGS. 2 & 3). This plane symmetrically bisects the bicycle and its rider, and includes the ground contacts of the two wheels. In this way, balance must be constantly maintained. The addition of cargo or any load that is not located centrally upon this plane, will adversely affect balance. While loads have been suspended before, as in panniers, there has never been a truly central, sagittal isolation of forces via suspension of the load from a point on the sagittal plane, i.e. a centered hook.

The load is fully supported by a large hook. Most bags have handles, including backpacks, and are thus easily placed upon the rack by simply placing on the hook. A single restraining strap serves to prevent swinging of the load and maintain the omnipotent central position. Removal of the load is equally as simple.

Since the load is suspended from a closed-loop hook, it is immune from shaking and bouncing forces that tend to displace loads from other rack types. This provides a very secure placement for any load that is contained within a handled bag. Note that the requirement of the load being within a handled bag is the standard for all racks. It is a natural requirement for platform-type racks (less so for baskets), that a load is unified to a single unit before mounting. For example, imagine mounting a dozen baseballs without the aid of a bag.

The mounting arrangement also allows for use on rear suspended bicycles, where there may be relative movement between the rear triangle and the seat tube. Standard bike racks, with their three points of attachment spanning the seat tube and the rear triangle, cannot accommodate such movements.

The invention is adjustable to accommodate different frame sizes. Since most of the joints are created at the time of consumer assembly, there is a desirable range of final dimensions to accommodate various bicycle frame sizes. This adjustability is enhanced by flexibility in the materials that make up the invention as well as the designed allowance for variations in the final shape.

For ease of shipment, all tubes and bars are separable for efficient packaging.

DESCRIPTION OF DRAWINGS

FIG. 1 shows the left main support tube (10L) that is curved in order to define a cargo carrying space. The right main support tube (10R) is not visible because of their identical profiles. These tubes (10L, R) comprise elongated support members. They are independently mounted on the rear triangle of a standard bicycle frame. The left main tube (10L) attaches to the left seat stay (81L) at the left/top mounting site (50LT); this main tube (10L) also attaches to the left chain stay (82L) at the left/bottom mounting site (50LB). The right main tube (10R) attaches in identical manner on the right side of the bicycle. They are connected by three transverse bars (20a, b, c) just above the rear wheel. These bars (20a, b, c) comprise protective means for preventing the load from contacting the rear wheel. These bars (20a, b, c) insert into holes along the inside of both main support tubes (10L, R). These transverse connections remain loose to accommodate variations in width of the rear triangles of various bicycle types and manufacturers. The two main tubes (10L, R) are then joined at their tops with the hook (30) via a simple nut and bolt assembly (40). The hook (30) is large enough to accommodate several handles, including the shoulder straps of typical backpacks. This hook (30) comprises load suspension means.

Figure 1:
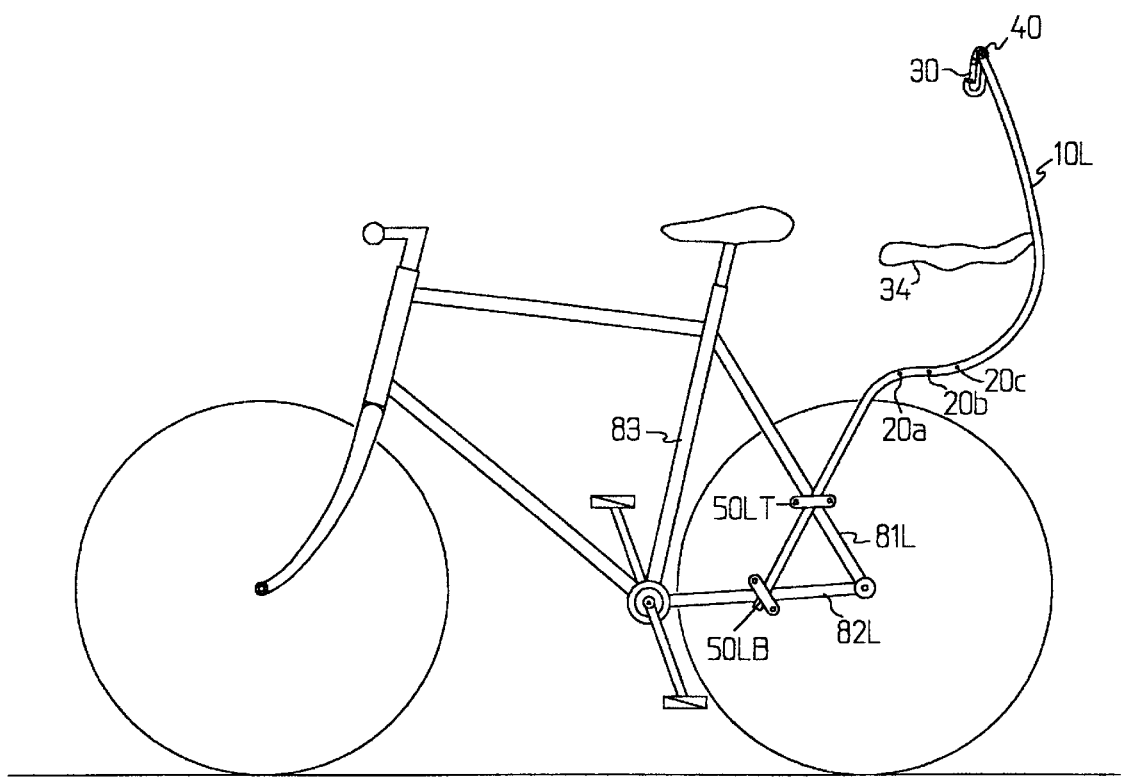
FIG. 1 shows a side view of the invention.

Also in FIG. 1 there is shown a restraining strap (34) for wrapping around the bulk of a load. It originates on one of the main support tubes (10) and ends on the other (see also FIG. 2). This strap may be elastic or plastic. It serves two purposes: to prevent swinging, and centering of the load. Typically, the orientation of this restraining strap (34) will be horizontal. The strap (34) holds the load against the left and right main support tubes (10L, R). In this way, swinging is avoided and the load is automatically centered . . . both critical factors for maintaining balance with respect to the central, sagittal plane (100).

Figure 2:
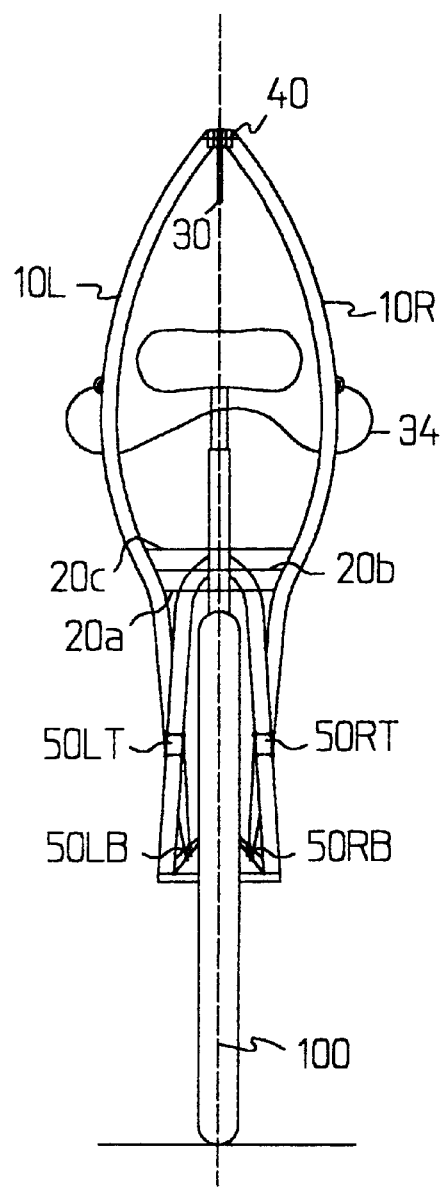
FIG. 2 shows a rear view of the invention, including the bisecting sagittal plane.

FIG. 2 shows a rear view of the invention. The symmetry of the invention with respect to the sagittal plane (100) is apparent. The left and right main support tubes (10L, R) are shaped as mirror images of each other. The three transverse bars (20a, b, c) connect the left and right tubes (10L, R) just above the rear wheel. The hook (30) is centrally located about 20–25 inches over the rear wheel and centered within the sagittal plane (100). This hook (30) functions to fully support the load. Note the continued symmetry of all four mounting sites (50 LT, LB, RT, RB).

Figure 3:
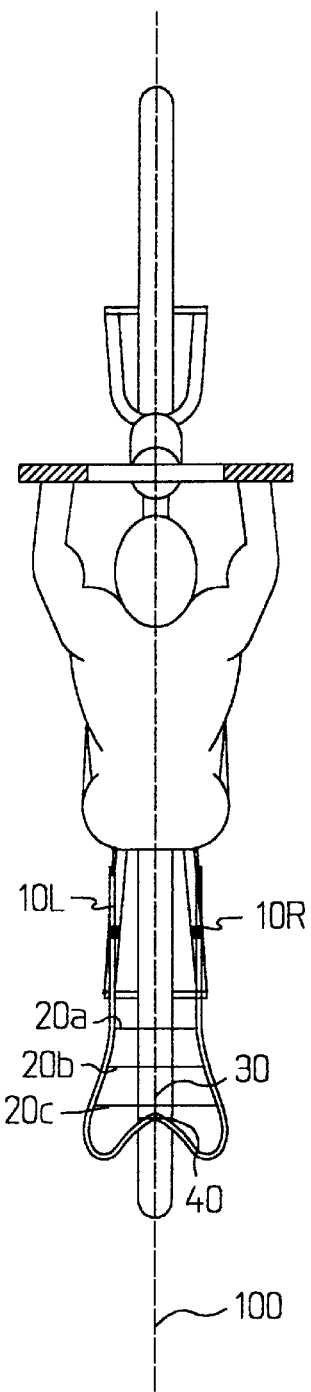
FIG. 3 shows a top view of the invention, including the bisecting sagittal plane.

FIG. 3 is a top view of the invention in its full context of the bicycle and its rider. Since the symmetry with respect to the sagittal plane (100) applies to the entire system, the structure of the invention conforms to this omnipotent requirement. Note the placement of the three transverse bars (20a, b, c) is well suited to protect a load that is hung from the hook (30) from rubbing against the rear wheel below.

Figure 4:
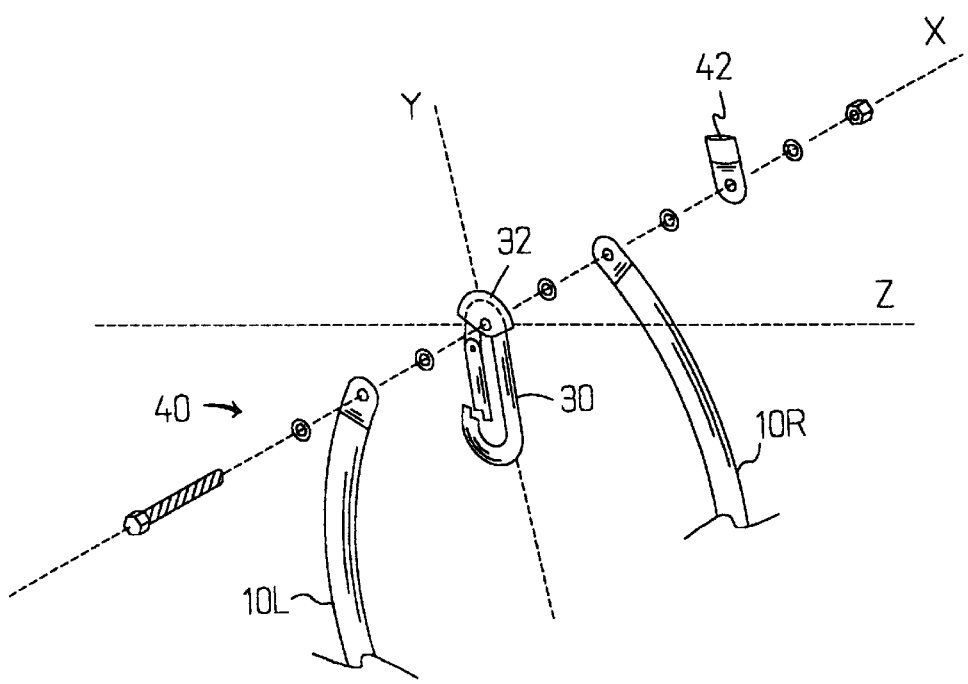
FIG. 4 shows an exploded view of the nut and bolt assembly at the top of the rack, including the closed-loop hook within the sagittal plane.

FIG. 4 shows the nut and bolt assembly (40) at the top of the invention. This assembly (40) includes: the tops of the main support tubes (10L, R), the hook (30) with its retention hardware (32), an optional taillight holder (42), and miscellaneous washers. Notice how the tops of the main support tubes (10L, R) are flattened and drilled to create tabs amenable to the nut and bolt assembly (40). A spring-loaded latch on the hook (30) maintains a closed loop, thereby providing a very secure mounting for any load that is contained within handled bags. The optional taillight holder (42) is a tube-stub that accommodates bicycle taillights designed to mount upon a seat post—a common feature today. Once again, there is emphasis of the placement of the hook (30) upon the sagittal plane—as well defined by the Y and Z axes shown.

Figure 5:
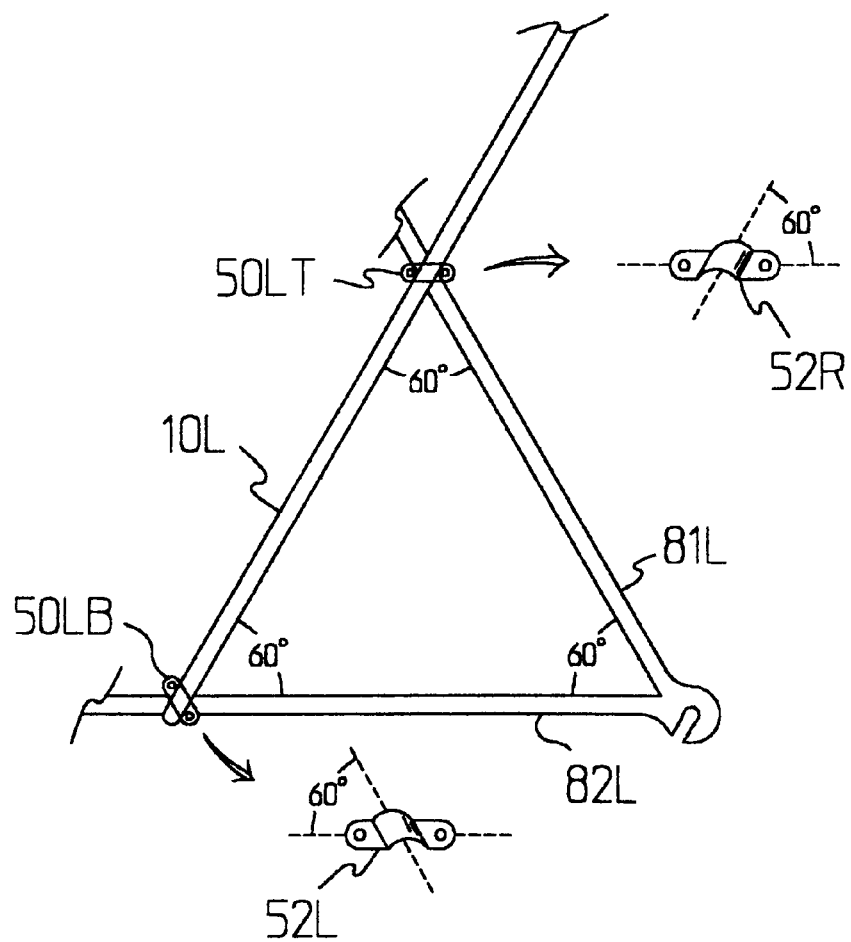
FIG. 5 shows the equilateral triangle formed by portions of the left main support tube, the left seat stay tube, and the left chain stay tube. Note the omnipresence of 60 degree angles, even in the mounting plates.

On most bicycles, the angle between the seat stays and the chain stays approximates 60 degrees (see FIG. 5). Since all four attachment points are approximately equidistant from the rear wheel axle, there is created the geometry of an equilateral triangle. This provides a desirable consistency of 60 degrees for all main tube (10) intersections with the bicycle frame at the four mounting sites (50LT, LB, RT, RB). As the chain stay tubes (82L, R) are near horizontal, the two main tubes (10L, R) rise from the bicycle frame at approximately 60 degrees.

The mounting hardware comprises nuts and bolts, and plates (52L, R). FIG. 5 shows that such plates (52L, R) cross over the intersecting tubes at approximately 60 degree angles. These plates (52L, R) exhibit a cylindrical indentation at a 60 degree angle relative to their long axis for easy and secure mounting to all tubes. The long axis of the plate (52) is defined as that axis which runs along and parallel to the longest portions of the plates. The diameter of the cylindrical indentation is slightly larger than the intersecting tubes for two reasons: to accommodate variations in tube diameters; and to accommodate slight variations in mounting angles between the main tubes (10) of the rack and the supporting tubes of various bicycle frames. All mounting can be securely accomplished by just two plate shapes—60 degrees 'left' (52L), and 60 degrees 'right' (52R). In this way, the consistent angles of the equilateral triangle provide for simple mounting hardware that is universally applicable to all mounting sites (50LT, LB, RT, RB).

Description of the Preferred Embodiment

Construction of the Invention

As noted earlier, the rack of the invention is mounted with hardware comprising nuts and bolts, and mounting plates (52L, R). When four 'left-handed' plates (52L) are used on the two mounting sites (52LT, LB) on the left side, their holes align to accommodate two bolts at each site. Similarly, four 'right-handed' plates (52R) are used on the right mounting sites (52RT, RB).

Once the two main support tubes (10L, R) are loosely in place, the three transverse bars (20a, b, c) are then inserted between them just above the rear wheel. These bars (20a, b, c) slide into holes along the inside surface of the main tubes (10L, R). They are not welded or otherwise fixated. As noted above, these bars (20a, b, c) remain loose to allow variation in the rack's width dimension.

The nut and bolt assembly (40) at the top of the invention is then put in place. This assembly (40) includes: the tops of the main support tubes (10L,R), the hook (30) with its retention hardware (32), an optional taillight holder (42), and miscellaneous washers. The hook (30) is directly affixed to, and supported by, the main support tubes (10L, R) which comprise elongated support members. Note that the top of the hook (30) is immobile relative to the main support tubes (10L, R).

The restraining strap (34) is recommended to be a bungee-type elastic cord with hooked ends and is deployed at various locations on the main tubes (10L, R), depending on the nature of the given load.

In order to accommodate size variation for universal application to all standard bicycle frames, much of the final assembly is done by the consumer. Herein also lies an opportunity for stress relief in the final structure when the bolting process is done 'hand-tight' in the initial assembly. This allows minor adjustments so that all parts are relaxed and bound together uniformly. If done correctly, this process will contribute significantly to structural integrity.

Operation of the Invention

Any handled bag, including backpacks, may comprise a load and be placed by its handles upon the closed-loop hook (30). While the load is suspended and fully supported by the hook (30), it must be prevented from swinging so as to maintain its placement within the sagittal plane (100). The restraining strap (34), which may be a bungee-type cord, is then deployed around the load. This secures the load to the two main tubes (10L, R) in order to prevent swinging. Typically, the orientation of this restraining strap (34) will be horizontal. There is intrinsic symmetry of the rack relative to the omnipotent central sagittal plane. This symmetry provides an automatic centering of the load as the restraining strap (34) secures it against the left and right main tubes (10L, R).

Backpacks have become ubiquitous bags due to their practicality and ergonomics. Note that nearly all backpacks have a small loop available at the top of the pack. This loop is centered between the shoulder straps and provides for an ideal placement upon the hook (30). Of course, in the absense of such a loop, the hook (30) is of such a size as to easily accommodate the shoulder straps.

The three transverse bars (20a, b, c) provide a safety limit for loads that may hang too low. These bars (20a, b, c) comprise a means for preventing the load from contacting the rear wheel. The bars (20a, b, c) also provide structural integrity for the rack of the invention.

In many previous designs, the usual bouncing and jostling that occur during bicycle riding, especially mountain biking, can displace a load off of a support platform. This real problem is completely solved by the invention, wherein gravity actually becomes an aid to help keep the load on the hook (30).

There is some spring-type movement of this rack, especially when it is fully loaded. While this to-and-fro motion is limited, it is important for the dissipation of energy. This is a basic suspension concept whereby abrupt forces can be spread over the structure of the rack, as well as over time. This distribution of energy will reduce the peak blow experienced by any particular part of the rack. Conversely, if the rack were perfectly rigid, then higher peak forces would increase the chances of mechanical failure.

The three transverse bars (20a, b, c) provide an excellent mounting site for an optional rear-wheel fender. Such a fender would keep the load clean relative to mud and other debris flying up from the spinning rear wheel below.

The optional taillight holder (42) may or may not be included upon the nut and bolt assembly (40). This tube-stub has a diameter approximately equal to seat posts, and therefore accommodates bicycle taillights designed to mount upon a seat post.

Many different containers or bags can be supported by this rack.

Interestingly, the center of gravity for the load is located at a height that is pleasingly close to the existing center of gravity of the bicycle/rider system. The load is also maintained within the central sagittal plane. These two factors combine to minimize the effects that the addition of load invariably has upon the complex dynamics that comprise bicycle riding.

Ramifications and Scope of Invention

While the above description contains many specificities, these should not be construed as limitations on the scope of the invention, but rather as an exemplification of one preferred embodiment thereof. For example, while all the materials in the preferred embodiment are metal, from the hollow main tubes (10L, R) to the solid transverse bars (20a, b, c), many other materials could be used, e.g. plastic, wood, fiberglass, and other composite materials. The shape of the rack of the invention could have many forms, such as varying curves or straight elements joined at sharp angles. Different hook types could be used, some of which may lack a spring-loaded latch. Different mounting hardware could be used, such as u-bolts.

Accordingly, the scope of the invention should be determined not by the embodiments illustrated, but by the appended claims and their legal equivalents.

List of reference numerals

| | |
|---|---|
| 10L | Left main support tube |
| 10R | Right main support tube |
| 20a | Front transverse bar |
| 20b | Middle transverse bar |
| 20c | Rear transverse bar |
| 30 | Closed loop hook |
| 32 | U-shaped retention hardware |
| 34 | Restraining strap |
| 40 | Nut & bolt assembly at top of rack |
| 42 | Optional taillight holder |
| 50LT | Left/Top mounting site |
| 50LB | Left/Bottom mounting site |
| 50RT | Right/Top mounting site |
| 50RT | Right/Bottom mounting site |
| 52L | 'Left-handed' mounting plate |
| 52R | 'Right-handed' mounting plate |
| 81L | Left seat stay tube |
| 81R | Right seat stay tube |
| 82L | Left chain stay tube |
| 82R | Right chain stay tube |
| 83 | Seat tube |
| 100 | Sagittal plane |

I claim:

1. A load carrier for use on a bicycle, the bicycle having a front wheel, a rear wheel, and a central sagittal plane, the wheels each being located substantially on the central sagittal plane of the bicycle, the carrier comprising:

a) an elongated support means for supporting a load adapted to be supported by a rear portion of the bicycle, and b) a hook supported by said elongated support means for suspending a load therefrom, and c) said hook is adapted to be constantly substantially located on said central sagittal plane, and d) said hook is adapted to be located above the rear wheel, and e) said hook is adapted to be located at a height appropriate for suspending a typical backpack above the rear wheel, and f) a restraining means for preventing said load from swinging, whereby said hook is adapted to suspend said load against gravity.

2. The load carrier of claim 1 further including:

a) a protective means for preventing the load from contacting the rear wheel while suspended from said hook.

3. A method for carrying a load on a bicycle, the bicycle having a front wheel, a rear wheel, and a central sagittal plane, the wheels each being located substantially on the central sagittal plane of the bicycle, the method comprising the steps of:

a) providing an elongated support means for supporting a load adapted to be supported by a rear portion of the bicycle, and b) providing a hook adapted to be supported by said elongated support means for suspending a load therefrom, and c) adapting said hook to be constantly substantially located on said central sagittal plane, and d) adapting said hook to be located above the rear wheel, and e) adapting said hook to be located at a height appropriate for suspending a typical backpack therefrom above the rear wheel of the bicycle, and f) adapting the load to be suspended from said hook, and g) restraining said load from swinging, whereby the balance of the bicycle is maintained.

4. The method of claim 3 further including:

a) providing a protective means for preventing the load from contacting the rear wheel while suspended from said hook.

5. A load carrier for use on a bicycle, the bicycle having a front wheel, a rear wheel, and a central sagittal plane, the wheels each being located in the central sagittal plane of the bicycle, the carrier comprising:

an elongated support means for supporting a load having a lower end adapted to be secured to a rear portion of the bicycle and an upper end, said upper end defining a connection located directly above the rear wheel of the bicycle;

a hook for suspending a load therefrom connected to said location such that said hook is suspended below said location, said hook being located in the central sagittal plane of the bicycle and directly above the rear wheel of the bicycle such that said hook is located at a height above the rear wheel appropriate for suspending a typical backpack therefrom without interfering with the rear wheel.

6. The load carrier of claim 5 further comprising a restraining means for preventing the load from swinging.

7. The load carrier of claim 5 further comprising a protective means associated with said elongated support means for preventing the load from contacting the rear wheel when suspended from said hook.

* * * * *